Nov. 6, 1945.  F. H. BOGART  2,388,594
MACHINE TOOL
Filed Feb. 21, 1942  5 Sheets-Sheet 3

INVENTOR.
FRED H. BOGART
BY Kwis Hudson & Kent
ATTORNEYS

Nov. 6, 1945. F. H. BOGART 2,388,594
MACHINE TOOL
Filed Feb. 21, 1942 5 Sheets-Sheet 5

INVENTOR.
FRED H. BOGART
BY Kwis Hudson & Kent
ATTORNEYS

Patented Nov. 6, 1945

2,388,594

UNITED STATES PATENT OFFICE 2,388,594

MACHINE TOOL

Fred H. Bogart, South Euclid, Ohio, assignor to The Warner & Swasey Company, Cleveland, Ohio, a corporation of Ohio Application February 21, 1942, Serial No. 431,809

14 Claims. (Cl. 29—62)

This invention relates to a machine tool and particularly to the stock feeding and gripping mechanism thereof.

The principal object of the invention is to provide an improved stock feeding and gripping mechanism for a machine tool.

Another object is to provide an improved stock feeding and gripping mechanism for a machine tool wherein the parts are so formed and arranged as to perform their operative functions in the correct sequence and within predetermined time periods, thus increasing the efficiency of the mechanism.

Another object is to provide an improved stock feeding and gripping mechanism wherein the parts of the mechanism are so formed and arranged that during those portions of the operative cycle in which they function under heavy loads they will transmit greater power than during those portions in which they are functioning under lesser loads.

Another object is to provide in a power-operated stock feeding and gripping mechanism an improved single lever control for said mechanism.

Another object is to provide an improved stock feeding mechanism for a machine tool.

A still further object is to provide an improved stock feeding mechanism for a machine tool which functions to feed the stock uniformly in predetermined lengths, thus obviating the necessity, in many instances, of using stock stops.

A still further object is to provide an improved stock feeding and holding mechanism which functions to centralize the stock and prevent slipping thereof and also which acts to maintain the stock against endwise movement under machining operations.

Further and additional objects and advantages not specifically referred to above will become apparent during the detailed description of embodiments of the invention which will be set forth hereinafter.

Referring to the accompanying drawings,

Figs. 6 and 7 are omitted.

Fig. 12 is a front elevational view of a stock feeding and gripping mechanism similar to Fig. 1 but equipped with a modified form of stock advancing or feeding means particularly adapted for larger diameter stock, it being noted that in this form no stock tube is shown.

It will be understood that the stock feeding and gripping mechanism embodying the present invention is shown by way of illustration applied to a work spindle which extends into and is supported by the headstock of a machine tool, as is well known in the art, and, therefore, said headstock has not been illustrated. It will be understood also that the housing which supports the stock feeding and gripping mechanism is secured by suitable means to the end of such headstock.

Figure 1:
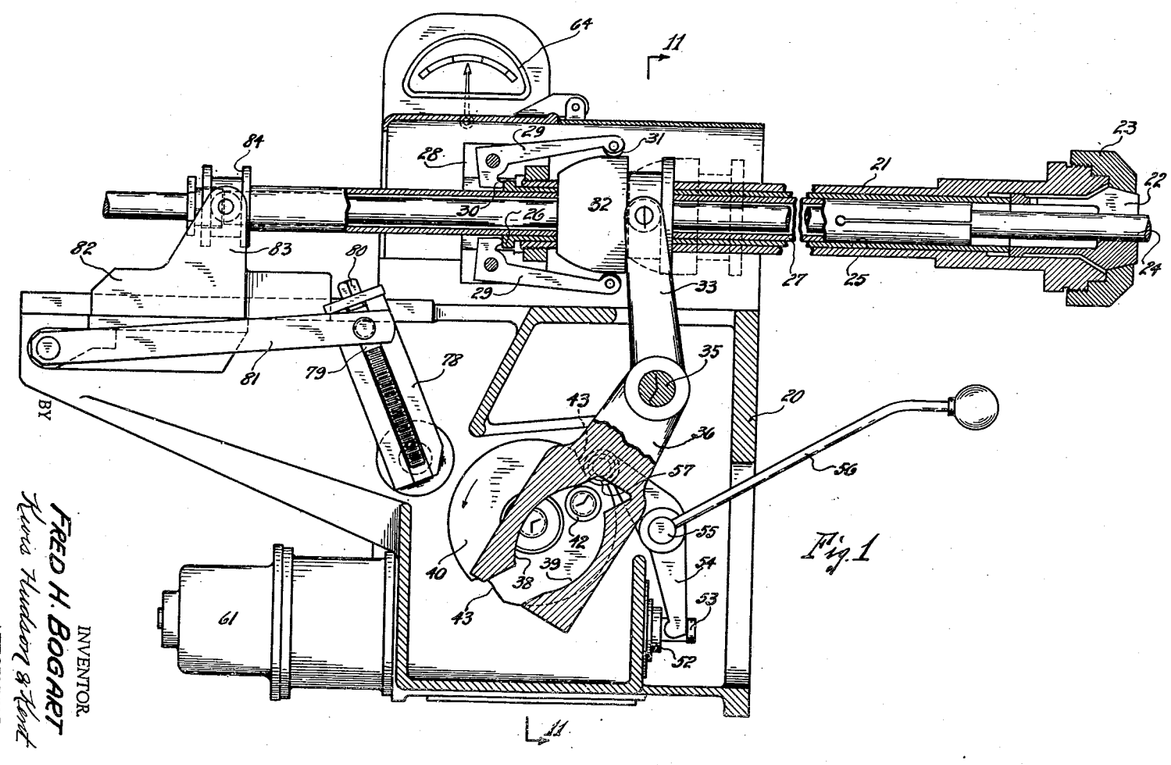
Fig. 1 is a view, partly in front elevation and partly in section, of a power-operated stock feeding and gripping mechanism embodying the present invention; a stock feeding tube being employed in the mechanism for the purpose of feeding small diameter stock.

Referring to Fig. 1, the housing just referred to is indicated at 20, while the work spindle is shown at 21. The stock gripping elements of the mechanism comprise in this instance a collet of the push-out type and having spring jaws 22 which have inclined arcuate surfaces cooperating with similarly inclined annular surfaces on the collet hood 23 which is screwed onto the end of the work spindle 21. It will be understood that movement of the collet toward the right, as viewed in Fig. 1, will cause the jaws to be cammed radially inwardly to grip the work 24. Slidably supported in the bore of the work spindle 21 is a collet sleeve 25 which has its right hand end engaging with the collet while its left hand end projects beyond the work spindle outside the headstock and is provided with an annular shoulder 26. Slidably mounted in the bore of the collet sleeve 25 is a stock feeding tube 27 provided at its right hand end with spring fingers adapted to grip and feed the stock when moved toward the right, as will be well understood. The left hand end of the stock feeding tube 27 is operatively connected with the stock feeding mechanism in a manner which will be pointed out in detail hereinafter.

A finger housing 28 is mounted adjustably on the work spindle 21, and this finger housing has pivotally mounted therein fingers 29 in the form of bell crank levers. The fingers 29 are provided with heel portions 30 contacting the annular shoulder 26 of the collet sleeve. The fingers also are provided with rollers 31 carried by the ends of the long arms of the levers and engageable with the periphery of a cone 32 that is slidably mounted on the work spindle and has an annular groove formed therein in which are located rollers carried by the lever arms 33 and 34, (see Figs. 1 and 11). A rockable pin 35 carried by the housing 20 is fixedly connected to the lever arms 33 and 34 The lever arm 33 has a downward extension below said pin 35, as indicated at 36.

Assuming that the collet jaws 22 are in the non-gripping position. the cone 32 will be in the dash line position of Fig. 1. It will be understood that when the lever arms 33 and 34 are rocked to move said cone from the dash line position to the full line position of Fig. 1, the fingers 29 will be spread to cause the heel portions 30 to press against the annular shoulder 26 of the collet sleeve and move the sleeve and the collet toward the right, whereupon the collet jaws 22 are cammed inwardly by the collet hood 23 to stock gripping position. Conversely, when the arms 33 and 34 are rocked in the opposite direction to move the cone 32 from the full line position of Fig. 1 to the dash line position, then the outward pressure upon the fingers 29 is relieved, whereupon the collet sleeve and collet move toward the left under the action of the spring jaws, and the gripping of said jaws on the work is relieved.

The mechanism by which the levers 33 and 34 are rocked to effect the gripping and releasing movements of the collet, as just explained. will now be described. The downwardly extending portion 36 of the lever 33 is provided on its inner side with a milled out recess 37, see Fig. 11, which recess has its walls shaped to define curved surfaces 38 and 39, (see Figs. 1, 3, 4 and 5). The walls of the milled out recess 37 intermediate the curved surfaces 38 and 39 are provided with straight portions constituting clearing spaces. A suitable bearing in the housing 20 rotatably supports a roller disk 40 which has an integral sleeve portion extending into said bearing and fixed to a shaft 41, (see Fig. 11). The disk 40 has on its outer face movement transmitting means in the form of a bearing pin carrying a roller 42 which extends into the milled out recess 37 in the downwardly extending portion 36 of the lever arm 33 and in such position as to cooperate with the curved surfaces 38 and 39.

Figures 6, 7, 8, 9, 10, 11:
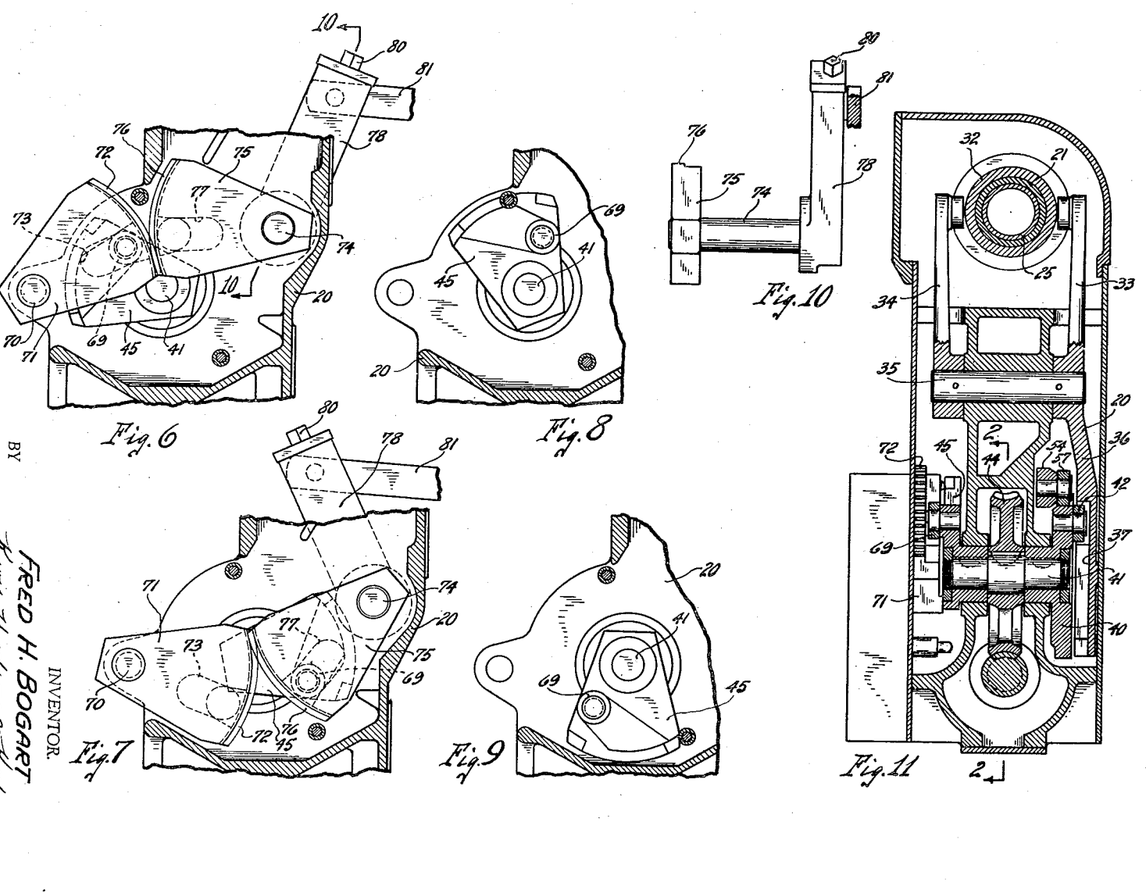
Fig. 6 is a fragmentary rear elevational view showing certain of the operative parts of the mechanism and is taken from the left hand side of Fig. 11 with the cover plate removed.
Fig. 7 is a view similar to Fig. 6 but showing the relationship of the parts during a different operative period of the mechanism.
Figs. 8 and 9 are fragmentary views showing certain of the operative parts disclosed in Figs. 6 and 7 but located, respectively, in different positions, while other of the operative parts shown in said
Fig. 10 is a detached view taken substantially along irregular line 10—10 of Fig. 6, looking in the direction of the arrows.
Fig. 11 is a sectional view taken substantially on line 11—11 of Fig. 1, looking in the direction of the arrows.

The disk 40 is provided on its circumference with a pair of recesses 43 which are spaced circumferentially of the disk from each other for a purpose which later becomes clear. The shaft 41 intermediate its ends is provided with an enlarged portion which has fixed thereto a worm wheel 44. Also fixed on the shaft 41 and rotatable in the bearing is the integral sleeve portion of a cam and roller disk 45, the purpose of which will later be explained in detail.

The worm wheel 44 meshes with a worm 46 formed on an elongated sleeve that is splined to a shaft 47. A shouldered sleeve bearing 48 is fixed in an opening in the housing 20 and is provided at its inner end with a bearing bushing 49 which supports the sleeve of the worm 46 and also forms an abutment for one end of a coil spring 50 which surrounds the shaft 47 and abuts at its opposite end the outer race of an anti-friction bearing 51. This outer race of the anti-friction bearing 51 is carried by a non-rotatable, but endwise displaceable, cup-shaped pusher member 52 that is slidably supported in the bearing sleeve 48 and projects outwardly of the end thereof.

The inner race of the anti-friction bearing 51 is carried by the shaft 47 and held in position by a lock nut 53 which is carried upon a reduced extension of the shaft 47 that projects through an opening in the pusher member 52. The lower forked end of a lever arm 54 freely straddles the lock nut 53 between the head of said nut and the outer side of the pusher member 52, see Figs. 1 and 2. The lever arm 54 is provided intermediate its ends with a hub portion fixed to a rockable shaft 55 that extends outwardly of the housing and has fixed thereto an operating handle 56. The lever arm 54 extends above the shaft 55 and carries at its upper free end a roller 57 which rides on the periphery of the disk 40.

Figure 2:
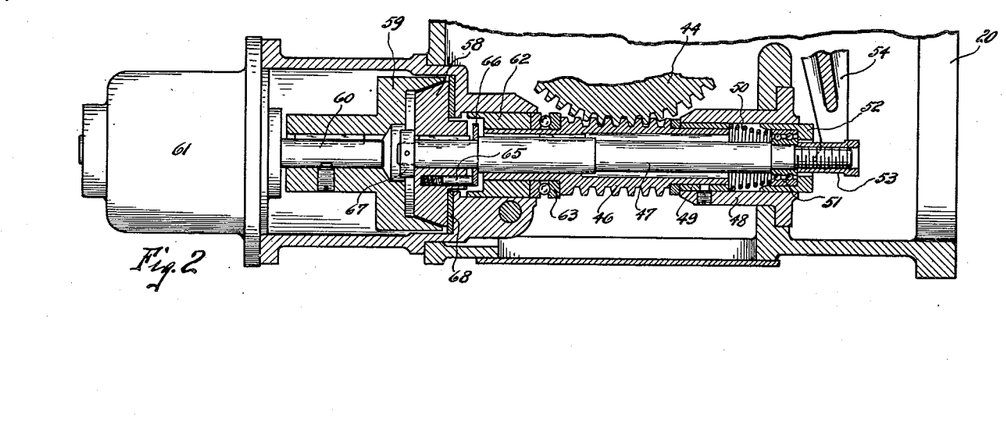
Fig. 2 is a fragmentary view, partly in section and partly in elevation, and is taken substantially on line 2—2 of Fig. 11, looking in the direction of the arrows.

It will be seen that when the lever arm 54 is rocked in a clockwise direction, as viewed in the drawings, the pusher member 52 is moved inwardly of the bearing 48 and against the pressure of the spring 50 with the result that the shaft 47 is displaced toward the left as viewed in Fig. 2 for a purpose now to be explained.

The left hand end of the shaft 47 has splined thereto a clutch member 58 of a friction clutch, the other clutch member of which is indicated at 59. The clutch member 59 is formed with an integral sleeve portion fixed to the motor shaft 60 of a flanged motor 61 which is secured to the outer end of an extension of the housing 20, see Figs. 1 and 2. This extension of the housing 20 is, for purposes of assembly, made in the form of a sleeve which at its right hand end extends into the housing. This inwardly extending portion of the sleeve supports a non-rotatable endwise movable thrust responsive member 62 which in turn supports the sleeve-like portion of the worm 46. An anti-friction thrust bearing 63 is interposed between the member 62 and a shoulder formed on the worm 46. The member 62 is shiftable endwise under the thrust of the worm 46 when said worm is driving worm wheel 44 and gripping force is being applied to the collet jaws 22. As described in my copending application Serial No. 411,357, filed September 18, 1941, the member 62 is operatively connected through mechanism not shown herein and which is responsive to the end thrust of the worm 46 with an indicating device 64 which indicates the gripping pressures of the collet jaws upon the work piece.

It will be seen that the resistance exerted by the worm wheel 44 to the rotation of the worm 46 will create an end thrust acting against the thrust bearing 63 and the member 62 and cause endwise displacement of said member. An internal shoulder formed in the extension of the housing which supports the member 62 acts as a positive stop to limit the displacement of said member toward the left, and such shoulder is so located as to permit the maximum displacement of the member 62. The shiftable clutch member 58 is provided with a plurality of circumferentially spaced recesses containing spring-pressed plungers 65 which engage with an abutment washer 66 on the shaft 47 and bearing against a shoulder on said shaft, one of said plungers being shown in Fig. 2. The spring-pressed plungers 65 act to hold the clutch member 58 against a collar 67 fixed to the left hand end of the shaft 47. It will be seen that when the lever 54 is rocked to shift the shaft 47 axially toward the left, the clutch member 58 will move with said shaft until it is in clutching engagement with the clutch member 59, after which further movement of the shaft 47 toward the left is relative to the clutch member 58 and results in the springs being compressed behind the plungers 65.

When the lever 54 is rocked in the opposite direction the spring 50 will shift the shaft 47 axially toward the right. The first part of this latter shifting movement causes a relative movement between the shaft 47 and the clutch member 58 until the collar 67 is in engagement with said member, after which the clutch member 58 and the shaft 47 move together until the right hand face of the clutch member 58 engages with the stationary brake disk 68 which acts to stop the rotation of the shaft 47 which has been disengaged from its driving relationship to motor 61. It will thus be seen that the spring 50 functions to disengage the friction clutch and also to apply the brake to stop the rotation of the shaft 47 and the worm 46 and to hold the same against rotation.

Assuming that the cone 32 is in the dash line position of Fig. 1 and the collet jaws 22 are in the non-gripping position, it will be seen that when the control lever 56 is depressed to engage the friction clutch and initiate rotation of the worm 46 and worm wheel 44 the roller 57 carried by the lever arm 54 is moved out of one of the recesses 43 in the disk 40. The rotation of the worm wheel 44 which has now been initiated causes the disk 40 to rotate and the roller 42 carried thereby to move so as to rock the lever arms 33 and 34 from the position shown in Fig. 4 to the position shown in Fig. 5, at which time the cone 32 is in its full line position of Fig. 1 and the fingers 29 are spread apart and the collet jaws are gripping the work 24. After the cone 32 has been brought to the full line position the worm wheel 44 and the disk 40 continue to rotate until the roller 57 which has been traveling on the circumference of the disk 40 engages in the other recess 43 of the disk at which time the friction clutch is disengaged under the action of the spring 50. the parts now being in the relationship indicated in Fig. 1. During the idle rotation of the worm wheel 44 and the disk 40 just referred to, the roller 42 on the disk 40 moves from the position of Fig. 5 to the position of Fig. 1, and no movement is imparted to the lever arms 33 and 34. As will later be pointed out, it is during this period that the stock feeding mechanism is restored from its advanced position to its initial position.

As previously stated, the shaft 41 has fixed to its left hand end, as viewed in Fig. 11, a cam disk 45 provided with movement transmitting means in the form of a roller. This disk is provided with camming portions which need not be referred to herein as they constitute operative parts of the mechanism for operating the indicating device 64 and have been fully described and explained in my said copending application Serial No. 411,357. The disk 45 carries in a thickened portion thereof a pin on which is mounted a roller 69. The housing 20 carries a bearing pin 70 on which is rockably mounted a plate 71 provided at its free end with a gear segment 72. The plate 71 is so located that the cam roller disk 45 lies to the right of the plate, as viewed in Fig. 11, and in a position where the roller 69 can pass into and out of a slot 73 formed in the plate as the disk 45 rotates. Referring to Figs. 6 and 7, it will be seen that the disk 45 and the roller 69 rotate in a clockwise direction beneath the plate 71. The housing 20 also rotatably supports a shaft 74 extending substantially parallel to the shaft 41 and having fixed to its left hand end, as viewed in Fig. 10, a plate 75 similar to the plate 71 and likewise provided at its free end with a gear segment 76 which meshes with the gear segment 72 of the plate 71. The plate 75 is provided with a slot 77 similar to the slot 73 in the plate 71 and arranged to allow the roller 69 to pass into and out of the slot 77 as the disk 45 rotates in a clockwise direction.

The end of the shaft 74 opposite to the end to which the plate 75 is attached has fixed thereto a lever arm 78 arranged for oscillating movement. The lever arm 78 is provided with a T-slot extending longitudinally of the arm and in which a shoe 79 is mounted for adjustment lengthwise of the slot by means of an adjusting screw 80. The shoe 79 is pivotally connected to one end of a link 81 and it will be clear that the adjustment of the position of the shoe 79 in the T-slot of the lever arm 78 regulates the amplitude of rocking movement imparted to the link 81 by the arm 78 which latter has a fixed rocking movement. The link 81 at its left hand end, as viewed in Fig. 1, is pivotally connected to a slide 82 supported on ways formed on the upper surface of an extension of the housing 20. The slide 82 is provided with an upstanding forked portion 83 which straddles a circular groove formed in the enlarged left hand end of the stock feeding tube 27. The tines of the forked portion 83 are provided with rotatable shoes located in the circular groove 84. It will be seen that while the stock feeding tube 27 may rotate relative to the forked portion 83, endwise movement of the slide 82 and said forked portion imparts endwise movement to the stock feeding tube.

The operation of the mechanism through a cycle that includes the opening of the collet jaws, the feeding of the stock, the closing of the collet jaws and the restoration of the stock feeding mechanism will now be explained.

In Fig. 1 the collet jaws 22 are shown in stock gripping position, at which time the cone 32 is in the full line position, the levers 33 and 34 and the roller disk 40 and roller 42 are in the relationship indicated in Fig. 1. Also at this time the roller 57 carried by the lever arm 54 rests in one of the depressions 43 on the periphery of the cam disk 40, and it will be understood that the friction clutch 58, 59 is disengaged, with the clutch member 58 in engagement with the brake disk 68, at which time the motor 61 is disconnected from the shaft 47 and no rotation is being imparted to the worm. Also at this time the stock feeding tube 27, stock feeding slide 82 and lever arm 78 are in the position shown in Fig. 1. Likewise at this time the cam roller disk 45 on the opposite end of the shaft 41 from the disk 40 is in the position shown in Fig. 6, while the plates 71 and 75, with the gear segments 72 and 76, occupy the relationship indicated in Fig. 6 and wherein the roller 69 carried by the disk 45 is in a position about to pass out of the slot 73 in the plate 71 at the start of the clockwise rotation of the disk 45.

The operator now depresses the control or operating handle 56 and rocks the lever arm 54 in a clockwise direction which lifts the roller 57 out of the recess 43 on the periphery of the disk 40 and also effects endwise movement of the clutch member 58 into engagement with the rotating clutch member 59 that is continuously driven by the motor 61. This engagement of the clutch members results in rotation of the worm 46 and the worm wheel 44, with a consequent rotation of the disk 40 in an anti-clockwise direction and of the cam roller disk 45 in a clockwise direction.

Figure 3:
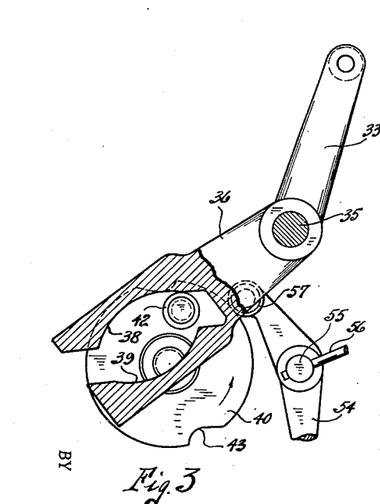
Figs. 3, 4 and 5 are detached elevational views of certain of the operative parts shown in Fig. 1 and illustrate the relationship of said parts during different periods in the operative sequence of the mechanism.

The first part of the anti-clockwise rotation of the disk 40 with the roller 57 riding on the periphery of the disk and maintaining the friction clutch engaged causes the roller 42 carried by the disk to move from the position shown in Fig. 1 to the position shown in Fig. 3 and to rock the downward extension 36 of the lever arm 33 from the position shown in Fig. 1 to the position shown in Fig. 3. It will be noted that the application of force to the extension 36 by the roller 42 is at a comparatively short radius from the axis of the extension. However, only a relative light force is required to shift the cone 32 to release the collet jaws. This movement of the downward extension 36 rocks the lever arms 33 and 34 to move the cone 32 from the full line position of Fig. 1 to the dash line position thereof, with the result that the pressure on the collet sleeve 25 is relieved and the gripping action of the jaws 22 of the collet on the work piece is released. During this movement that effects the release of the collet jaws on the work piece the stock feeding mechanism is idle while the cam roller disk 45 idly rotates in a clockwise direction from the position shown in Fig. 6 to the position shown in Fig. 8 and during this idle rotation of the disk 45 the roller 69 passes from the slot 73 in the plate 71 into the outer end of the slot 77 in the plate 75 without imparting movement to said plates.

Figure 4:
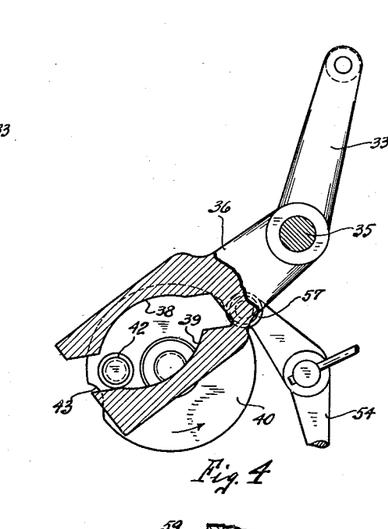

The roller disk 40 now continues to rotate in an anti-clockwise direction from the position shown in Fig. 3 to the position shown in Fig. 4 and during this time the roller 42 on the disk 40 travels idly along the curved surface 38 of the downward extension 36 of the lever arm 33 without imparting movement to said extension and to the lever arms 33 and 34 until the roller 57 carried by the lever arm 54 and which has been rolling on the circumference of the disk 40 comes into registry with the other recess 43 in the periphery of the disk 40 to allow the spring 60 to rock the lever arm 54 and handle 56 in an anti-clockwise direction and to effect the disengagement of the clutch members 58 and 59 and the engagement of the clutch member 58 with the brake disk 68 to stop the drive to the worm 46, at which time the disk 40 comes to rest in the position shown in Fig. 4.

During the rotation of the disk 40 in an anti-clockwise direction from the position shown in Fig. 3 to the position shown in Fig. 4 the cone 32 remains in the dash line position of Fig. 1 while the cam roller disk 45 moves in a clockwise direction from the position shown in Fig. 8 to the position shown in Fig. 7.

This movement of the cam roller disk 45 causes the roller 69 carried thereby and which is in the slot 77 of the plate 71 to rock said plate from the position shown in Fig. 6 to the position shown in Fig. 7 and through the intermeshing gear segments 76 and 72 to also rock the plate 71. The movement of the plate 75 from the position shown in Fig. 6 to the position shown in Fig. 7 rocks the shaft 74 to move the lever arm 78 and the link 81 from the position shown in Fig. 6 to the position shown in Fig. 7 and such movement of the lever arm and link moves the slide 82 and the stock feeding tube 27 in a stock feeding direction a predetermined distance by virtue of the previous adjustment of the shoe 79 by the adjusting screw 80 to feed the stock 24 a predetermined length.

As previously explained when the roller disk 40 reaches the position shown in Fig. 4, at which time the stock has been fed, as just referred to, the parts come to rest by the disengagement of the friction clutch. Of course the operator may, at his option, manually hold the handle 56 in its downward position throughout the stock releasing and feeding operations and until the roller 57 passes over the other recess 43 on the periphery of the disk 40 without engaging in said recess to maintain the friction clutch engaged so that the parts will continue to operate to close the collet jaws 22 into gripping position upon the work piece and to restore the stock feeding mechanism to the position shown in Fig. 1. In such instance the disk 40 does not stop after making approximately a half revolution but rotates through a complete revolution. However, the operator may desire to check the length of stock fed forward by the stock feeding mechanism in order to make adjustments if necessary, and in such an event instead of manually holding the handle 56 in its downward position, he releases said handle after momentarily depressing the same so that the roller 57 will engage in said other recess 43 to stop the actuation of the parts after the disk has completed substantially a half revolution and after the collet jaws have been released and the stock has been fed forwardly by the stock feeding mechanism.

Assuming that the operator has acted in the last referred to manner, it will be understood that he must again depress the handle 56 momentarily to cause the collet jaws 22 to grip the stock and to effect restoration of the stock feeding mechanism to its original position. When the operator does this and the friction clutch is again engaged the roller disk 40 rotates in an anti-clockwise direction from the position shown in Fig. 4 to the position shown in Fig. 5 and during such rotation the roller 42 moves the downward extension 36 from the position shown in Fig. 4 to the position shown in Fig. 5 with a resultant rocking of the lever arms 33 and 34 to move the cone 32 from the dash line position of Fig. 1 to the full line position thereof.

Figure 5:
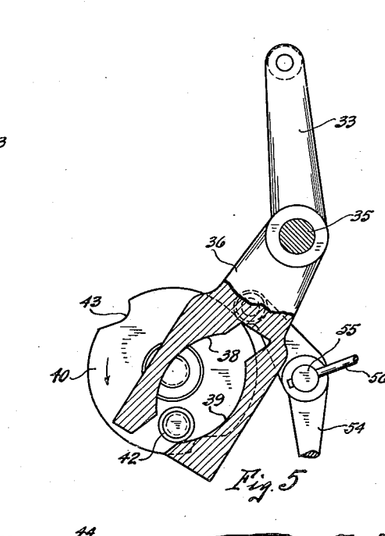

It will be noted that during the movement of the roller 42 from the position shown in Fig. 4 to the position shown in Fig. 5 that said roller exerts its force against the extreme lower end of the extension 36, that is the force of the roller 42 is applied at a point of maximum leverage to apply efficiently the desired force to the cone 32 to attain the requisite powerful gripping pressure of the collet jaws 22 on the work stock.

During the movement of the disk 40 in an anti-clockwise direction from the position shown in Fig. 4 to the position shown in Fig. 5 the cam roller disk 45 rotates idly from the position shown in Fig. 7 to the position shown in Fig. 9, during which time the roller 69 carried by the disk 45 passes idly out of the slot 77 of the plate 75 and into the slot 73 of the plate 71 without effecting any rocking movement of the plates or any movement of the lever arm 78, link 81 and slide 82.

When the parts are in the position shown in Fig. 5 the roller 57 is traveling on the periphery of the disk 40, which means that the friction clutch remains engaged and the drive continues to the worm 46 and worm wheel 44. Therefore after the collet jaws 22 have been restored to gripping position on the stock the roller disk 40 continues to rotate idly in an anti-clockwise direction from the position shown in Fig. 5 to the position shown in Fig. 1 and during this rotation the roller 42 travels idly along the curved surface 39 of the milled out recess 37 without imparting movement to the downward extension 36. The idle movement of the disk 40 continues until the roller 57 engages in the first mentioned recess 43 on the periphery of the disk, as shown in Fig. 1, at which time the spring 50 restores the lever arm 54 and handle 56 to the position shown in Fig. 1, disengages the clutch members 58 and 59, engages the clutch member 58 with the brake disk 68 and stops the drive to the worm 46.

During said idle rotation of the disk 40 in an anti-clockwise direction the cam roller disk 45 is rotating in a clockwise direction from the position shown in Fig. 9 to the position shown in Fig. 6. This rotation of the cam roller disk 45 causes the roller 69, which is now in the slot 73 of the plate 71 to rock said plate from the position shown in Fig. 7 to the position shown in Fig. 6 and through the intermeshing gear segments 72 and 76 to also rock the plate 75, shaft 74, lever arm 78 and link 81 from the position shown in Fig. 7 to the position shown in Fig. 6. This rocking of the parts last mentioned causes the slide 82 and the stock feeding tube 27 to be moved endwise toward the left, as viewed in Fig. 1, to their original position and during such movement the spring jaws, not numbered, at the right hand end of the stock feeding tube 27 slide idly over the stock, which is held now by the collet jaws 22.

It will be understood that the sequence of operations hereinabove explained will be repeated as each length of fed stock has been machined and cut off and that the control of the stock gripping and stock feeding mechanisms is effected through the single control or operating handle 56 which the operator only has to momentarily depress to effect the requisite release of the collet jaws, feeding of the stock, regripping of the collet jaws on the stock and the restoration of the stock feeding mechanism.

In Figs. 12 to 18 inclusive there is disclosed a different form of stock feeding mechanism which does not use a stock feeding tube and one which is especially adapted for larger diameter stock. The stock feeding mechanism disclosed in Figs. 12 to 18 inclusive is actuated by the same mechanism as the stock feeding mechanism of Figs. 1 to 11 inclusive.

Referring to Fig. 12 the bar stock is indicated at 85. The stock gripping mechanism and the operative parts which actuate said gripping mechanism and which actuate the stock feeding mechanism are identical with the corresponding elements of Figs. 1 to 11 inclusive and consequently in the description relating to Figs. 12 to 18 inclusive the said identical elements will be identified by the same reference characters previously used.

The link 81 in Fig. 12 instead of being pivotally connected with a stock feeding slide corresponding to the slide 82 is pivotally connected to a slide 86 mounted on ways formed on the upper side of the projection of the housing 20. The slide 86 has an upstanding portion 87 provided with a central opening therethrough and rotatably supporting therein by means of anti-friction bearings 88 carried by the portion 87 a sleeve 89 which at its right hand end is provided with an outstanding flange 90 that engages in a recess formed in the right hand face of the portion 87. It will be seen that movement of the slide 86 and portion 87 toward the right, as viewed in the drawings, will cause a corresponding movement of the sleeve 89. The anti-friction bearings 88 are held in position by a suitable lock washer 91, well known in the art and which lock washer engages in a recess formed in the sleeve 89, wherefore endwise movement of the slide 86 and portion 87 toward the left also causes a similar movement of the sleeve 89. In other words, the portion 87 of the slide 86 and the sleeve 89 move endwise together while the sleeve 89 can rotate freely in the portion 87.

The flange 90 of the sleeve 89 is provided with a plurality of radially extending T-slots 92, there being two of these T-slots shown in the present illustration and diametrically arranged with respect to each other, although it will be understood that a greater or lesser number of T-slots may be employed if desired. The T-slots 92 adjustably guide and support the heads of wedge members 93 which members project perpendicularly from the flange 90 toward the right, as viewed in the drawings. The heads of the wedge members 93 can be adjusted in the T-slots 92 at varying radial distances from the center of the sleeve 89 while the wedge members will move endwise with the sleeve due to the T-slot connection therewith.

The slide 86 has secured thereto rear and front gibs 94 and 95 which retain the slide on the ways. The front gib 95 is extended toward the right, as viewed in Fig. 13, and is provided with elongated slots 96 through which slots extend shouldered screws 97 that are threadedly engaged with a slidable support 98. The support 98 has an upstanding portion 99 provided with a central opening and rotatably supporting in said opening by means of anti-friction bearings 100 a sleeve 101 which is provided intermediate its ends with an outstanding flange 102 contacting the left hand side of the upstanding portion 99 of the support 98. The sleeve 101 can rotate freely in the portion 99 but will move endwise with said portion 99, due to the engagement of the flange 102 with the portion 99 and to the engagement of the lock washer 103 for the anti-friction bearings 100 with a groove in the sleeve 101, as will be well understood.

The flange 102 of the sleeve 101 is provided with radially extending openings arranged diametrically to each other and slidably receiving radially adjustable jaw carriers later to be referred to. A plate 104 is secured to the left hand face of the flange 102 and has an integral sleeve portion 105 telescopically extending into the sleeve 89. It will be understood that the plate 104 and sleeve portion 105 could be integral with the sleeve 101 and the flange 102, but for the purposes of manufacture and assembly the plate and its sleeve portion are made as a separate element detachably connected to the flange 102. The plate 104 is provided with radially extending openings 106 substantially of the width of the wedge members 93 and which members slidably pass through the openings 106 and into the radially extending openings formed in the flange 102.

It will be seen that the sleeve 101, flange 102, plate 104 and its sleeve portion 105 can move endwise relative to the sleeve 89 but will rotate with said sleeve 89, since the wedge members 93 in the openings 106 act as keys for this rotative movement.

As previously referred to, the radial openings in the flange 102 movably support jaw carriers 107. Although Fig. 15 actually shows the construction of the stationary support that is to the left of the slide 86 in Fig. 13, reference may be made to said Fig. 15 in connection with the description of the slidable support 98 that is at the right of the slide 86, since both supports include similar elements designated by the same reference characters. These carriers 107 are provided with openings through which the wedge members 93 project. The carriers 107 above the wedge members 93 support rollers 108 in contact with the upper straight side of the wedge members 93. The carriers 107 slidably support beneath the wedge members 93 radially movable jaws 109 which carry rollers 110 that contact the inclined lower surface of the wedge members 93. The jaws 109 are adapted to engage and grip the bar stock 85 when they are moved radially inwardly relative to the carriers by the wedging action of the wedge members 93.

The carriers 107 are radially adjustable with an equalized movement for different diameter stock by the means now to be explained. The carriers on one side thereof are provided with threaded portions 111 engaging with right and left handed screw portions 112 formed on a shaft extending through the flange 102 and along side but parallel with the jaw carriers 107. The shaft with the screw portions 112 can be rotated by means of a suitable wrench fitting in the socket 113 at the upper end of the shaft and accessible from the upper side of the flange 102.

It will be understood that rotation of the shaft effects equalized inward or outward movement of the carriers 107 to approximately adjust the jaws 109 for different diameter stock. The shaft can be locked against rotation after it has been rotated for adjustment by means of a lock screw 114 mounted in the flange 102.

At the rear of the slidable support 98 an elongated flat friction plate 115 is located between the depending portion of the support and the rear surface of the rear way on the extension of the housing 20. The plate 115 is connected to the support 98 to move therewith by pins 116, see Figs. 14 and 18. The depending portion at the rear of the support 98 is provided with a plurality of threaded openings spaced longitudinally of the support and in which are mounted coil springs 117 held in position by threaded plugs 118 screwed into the openings, see Figs. 14 and 17. It will be seen that the springs 117 exert pressure on the plate 115 and cause the same to frictionally engage with the rear surface of the rear way on the housing 20, thus producing a friction drag to the movement of the support 98 for a purpose later to be explained.

At the left of the sleeve 89 is a flange 119 which has an integral elongated sleeve portion 120 telescoping within the sleeve portion 105 and within the sleeve 89 of the flange 90. The sleeve 89 is provided internally and at its outer end with a circumferential groove 121 formed by an internal rib in the sleeve 89 and by an inwardly extending flange at the outer end of said sleeve, see Figs. 13 and 16.

A spring 122 is mounted in the groove 121 and said spring at alternate circumferentially spaced points contacts the interior of the sleeve 89 and the exterior of the sleeve 120, therefore producing a frictional drag to relative telescopic movement between the said sleeves.

The flange 119 is identical with the flange 90 in that it is provided with a plurality of radially extending T-slots 92 which adjustably support the heads of a plurality of radially movable wedge members 93. A normally stationary support 123 is mounted on the ways of the extension of the housing 20 for adjustment thereon and said support can be clamped and locked in adjusted position against endwise movement on said ways by a clamp 124 and a lock screw 125. The stationary support 123 has an upstanding portion 126 which is provided with a circular opening in alignment with the opening in the portion 87 of the slide 86 and also with the similar opening in the portion 99 of the slidable support 98. The portion 126 is substantially the same as the portion 99, except that it is of greater width and can accommodate a pair of anti-friction bearings 100.

The work gripping means carried by the portion 126 of the stationary support 123 is identical with the work gripping means carried by the portion 99 of the slidable support 98 and the parts thereof will be given the same reference characters. As already explained the work gripping means comprises a sleeve 101 which is provided intermediate its ends with an outstanding flange 102 contacting in this instance the right hand side of the portion 126 of the stationary support 123. The sleeve 101 rotates freely in the upstanding portion 126 but is held against endwise movement relative to said portion by the flange 102 and by the engagement of the lock washer 103 for the anti-friction bearings 100 with a groove in the sleeve 101 as will be well understood. As already explained, the flange 102 of the sleeve 101 is provided with radially extending openings arranged diametrically to each other and slidably receiving radially adjustable jaw carriers 107. A plate 127 is secured to the right hand face of the flange 102 and corresponds to the plate 104 but is not provided with an integral sleeve portion. The plate 127 is provided with radially extending openings 128 corresponding to the openings 106 in the plate 104 and substantially of the width of the wedge members 93, so that said wedge members can slidably pass through the openings 128 and into the radially extending openings formed in the flange 102. The plate 127 is also provided with openings through which extend headed stop screws 129, which are screwed into the flange 119 and have their heads to the left of the plate 127. The purpose of the screws 129 is to limit relative movement between the flange 119 and the plate 127 (see Fig. 14).

It will be seen that the sleeve 101, flange 102 and plate 127 will rotate with the flange 119, since the wedge members 93 act as keys. It will also be seen, however, that the wedge members 93 can move endwise relative to the plate 127 and the flange 102. It will further be seen that the wedge members 93 can move radially of the flange 119 and the flange 102 in the slots 128 when the jaw carriers 107 are adjusted radially.

As already explained, the carriers 107 are provided with openings through which the wedge members 93 project. The carriers 107 above the wedge members 93 support rollers 108 in contact with the upper straight side of the wedge members 93 and beneath the wedge members the carriers slidably mount radially movable work gripping jaws 109 which carry rollers 110 that contact the inclined lower surfaces of the wedge members 93. The jaws 109 are adapted to engage and grip the bar stock 85 when the jaws are moved radially inwardly by the wedging action of the wedge members 93. The carriers 107 can be adjusted radially inwardly and outwardly for different diameter work by the shaft having the right and left hand screw portions 112 as has already been explained.

The operation of the stock feeding mechanism disclosed in Figs. 12 to 18 inclusive will now be explained. It will be understood that the work gripping mechanism and the actuating means for imparting the work feeding movement and the restoring movement to the slide 86 function, as already explained, in connection with the disclosures of Figs. 1 to 11 inclusive.

In Fig. 12 the collet jaws 22 are gripping the work. At this time the work gripping jaws 109 carried by the stationary support 123 are also gripping the work 85, since the wedge members 93 carried by the flange 119 are in wedging position, see Fig. 13. Also at this time the slide 86 has been restored to the position it occupies before the work feeding movement is imparted thereto.

Figure 13:
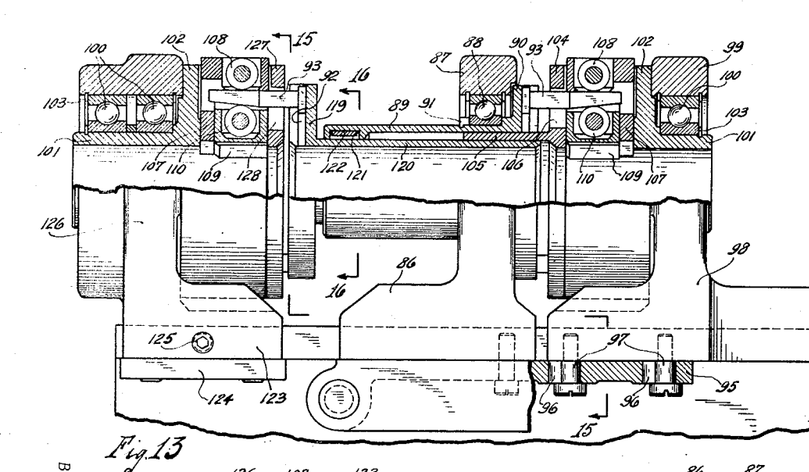
Fig. 13 is a view, partly in elevation and partly in section, of the stock advancing or feeding means shown in Fig. 12 and on a larger scale.
Figure 14:
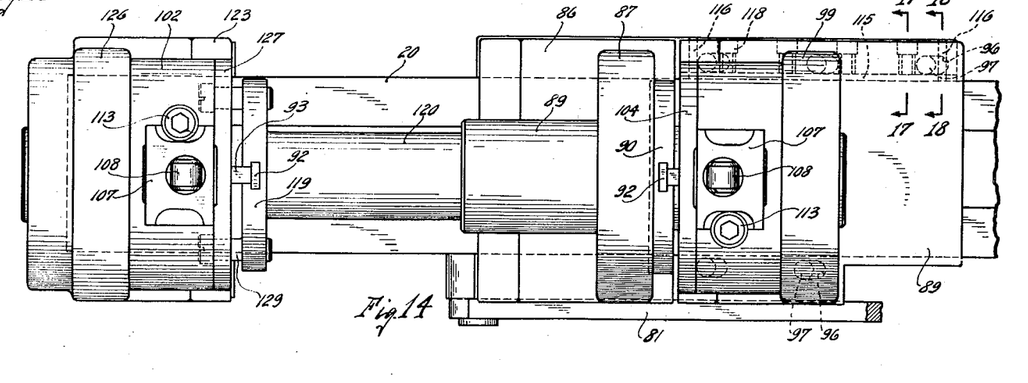
Fig. 14 is a top plan view of the stock advancing or feeding means shown in Fig. 13 and with the parts thereof in different relationship.
Figures 15, 16, 17, 18:
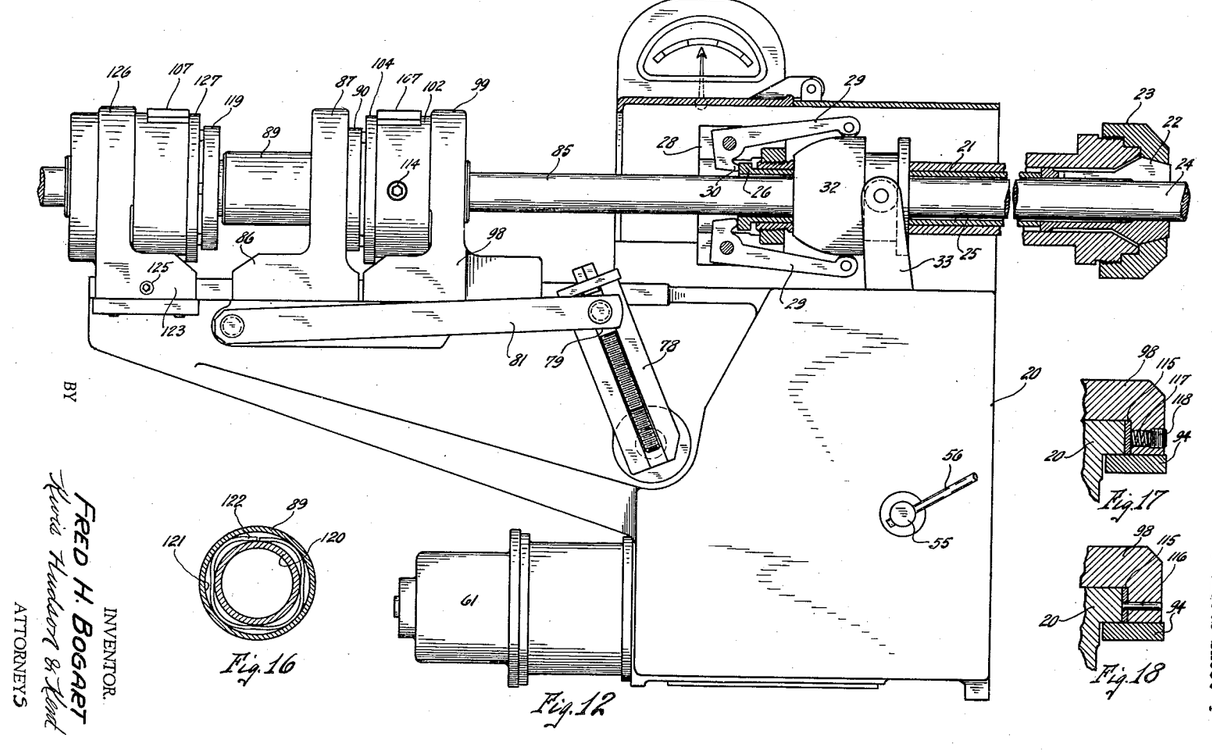
Fig. 15 is a sectional view taken on irregular line 15—15 of Fig. 13, looking in the direction of the arrows.
Fig. 16 is a detail sectional view taken substantially along line 16—16 of Fig. 13, looking in the direction of the arrows.
Figs. 17 and 18 are detailed sectional views taken, respectively substantially along lines 17—17 and 18—18 of Fig. 14, looking in the direction of the arrows.
Figure 15:
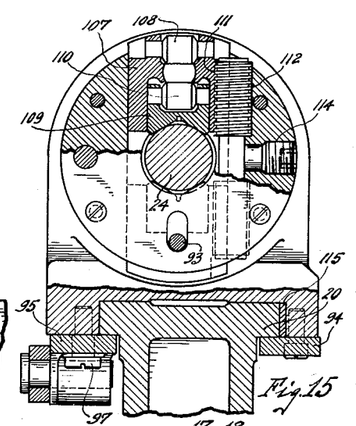

Assuming that the operator has moved the control handle 56 to effect a release of the gripping action of the collet jaws on the work and to feed a length of the stock for a new work piece, it will be understood that the movement of the link 81 causes the slide 86 to move toward the right, as viewed in Fig. 13. The very first part of this movement of the slide 86 toward the right accomplishes two things simultaneously; one of these things is that as the portion 87 of the slide 86 moves toward the right it carries with it the flange 90 and the sleeve 89 and forces the wedge members 93 carried by said flange endwise toward the right between the rollers 108 and 110 to move the work gripping jaws 109 into gripping relation with the work 85. This movement of the sleeve 89 with the slide 86 also effects movement toward the right of the sleeve 120 and flange 119, due to the frictional grip of the spring 122 on the sleeve 120. The movement of the sleeve 120 and flange 119 moves the wedge members 93 carried by the latter toward the right and relieves the gripping pressure of the jaws 109 associated with the stationary support 123 upon the work piece.

The initial portion of the movement of the slide 86 toward the right does not move the slidable support 98 since the latter is held in position by the friction plate 115 and also because there is a lost motion connection between the front gib 95 and the screws 97 by virtue of the slots 96. Consequently, the movement toward the right of the wedges 93 carried by the flange 90 results in radially moving the jaws 109 associated with the slidable support 98 into work gripping position. The continued movement toward the right of the slide 86 after the jaws 109 have gripped the work overcomes the resistance of the friction plate 115 and causes the slidable support 98 and the jaws carried thereby to move toward the right as a unit with the slide 86. This unitary movement of the slide 86 and slidable support 98 effects a feeding movement toward the right of the stock. During this feeding movement the sleeve 89 moves relative to the sleeve 120, since the heads of the stop screws 129 carried by the flange 119 have already engaged with the inner side of the plate 127, see Fig. 14. During the feeding movement just referred to the friction plate 115 constantly exerts a drag to the movement of the slidable support 98, and consequently the wedge members 93 act continuously to urge the jaws 109 into tighter work gripping relationship. At the end of the feeding movement the parts are in the position shown in Fig. 14.

Assuming that the collet jaws 22 have again gripped the stock and the link 81 moves in a direction to restore the slide 86 to its original position the following sequence of operations occurs: The first part of the movement of the slide 86 toward the left effects no movement of the slidable support 98, due to the grip of the friction plate 115. However, the first part of the restoring movement of the slide 86 moves the wedge members 93 carried by the flange 90 in a left hand direction to relieve the gripping pressure of the jaws 109 associated with the slidable support 98 on the work piece. Simultaneously with the relieving of the gripping pressures of the jaws 109 just referred to, the sleeve 120 moves toward the left along with the sleeve 89, due to the friction grip of the spring 122 and consequently the wedge members 93 carried by the flange 119 move toward the left and force the jaws 109 associated with the stationary support 123 into gripping relationship with the work 85. At this time the screws 97 come into contact with the right hand ends of the slots 96 in the front gib 95, with the result that continued movement of the slide 86 toward the left moves the slidable support 98 also toward the left. This continued movement of the slide 86 toward the left causes the sleeve 89 to move toward the left over the sleeve 120, but due to the frictional grip of the spring 122 on the sleeve 120 the latter is constantly urged toward the left and the wedge members 93 carried by the flange 119 constantly urge the jaws 109 of the stationary support 123 into holding and gripping relationship with the work 85 until the parts again function to feed the stock.

It will be appreciated that the jaws 109 associated with the stationary support 123 exert gripping pressure on the work during the entire period of the machining operation and consequently the work is held centrally in position at a point substantially removed from the point at which the collet jaws 22 grip the work, wherefore whipping of the bar stock is substantially eliminated. The jaws 109 of the stationary support 123 also assist the collet jaws 22 in holding the work under heavy machining operations to prevent any endwise movement of the work.

Although several preferred embodiments of the invention have been illustrated and described herein, it will be understood that the invention is susceptible of various modifications and changes within the scope of the appended claims.

Having thus described my invention I claim:

1. A stock feeding device for a machine tool comprising stock feeding means, a power source, an intermittently movable shaft, a normally inoperative driving connection between said power source and said shaft, and operative connections between said shaft and said means for alternately actuating the latter in a stock feeding direction and for restoring the same to its original position and including a disk fixed to said shaft, a second disk fixed to said shaft, and a control member movable to render said driving connection operative, said second disk and said control member having cooperating means for rendering said driving connection inoperative after a predetermined operative period.

2. A stock feeding and gripping device for a machine tool comprising stock gripping means, stock feeding means, a power source, an intermittently movable shaft, a normally inoperative driving connection between said power source and said shaft, and operative connections between said shaft and both of said means for alternately actuating the latter and including a pair of disks fixed to said shaft, one of which is in the drive train to said stock gripping means and the other of which is in the drive train to said stock feeding means, and a control member movable to render said driving connection operative and inoperative, one of said disks and said control member having cooperating means for rendering said driving connection inoperative after a predetermined operative period.

3. A stock feeding device for a machine tool comprising stock feeding means, a rotatable shaft, operative connections between said shaft and said means for alternately actuating the latter and restoring the same to its former position and including an element carried by said shaft and provided with movement transmitting means, a pair of operatively interconnected plates each provided with camming surfaces with which said last means intermittently cooperates during rotation of said element, and means operatively connecting one of said plates with said feeding means.

4. A stock feeding device for a machine tool comprising stock feeding means, a rotatable shaft, operative connections between said shaft and said means for alternately actuating the latter and restoring the same to its former position and including an element carried by said shaft and provided with movement transmitting means, a pair of rockable plates provided with intermeshing gear segment portions and each having a camming slot with which said last means intermittently cooperates during rotation of said element, and means operatively connecting one of said plates with said feeding means.

5. A stock feeding and gripping device for a machine tool comprising stock gripping means, stock feeding means, an intermittently movable shaft, a disk operatively associated with said shaft to be rotated thereby and provided with a roller, operative connections between said stock gripping means and said disk and including an element provided with surfaces cooperating with said roller to periodically close and release said stock gripping means during different portions of the movement of said disk, a second disk operatively associated with said shaft and rotated thereby and provided with a roller, and operative connections between said second disk and said stock feeding means and including slotted movable plates and arranged so that the roller on said second disk during the rotation of the latter alternately engages in the slots of said plates to move the same and intermittently actuate and restore said stock feeding means.

6. A stock feeding and gripping mechanism comprising stock gripping means, stock feeding means, a driving source, an intermittently movable shaft, a normally inoperative driving connection between said driving source and said shaft, a disk operatively associated with said shaft to be rotated by the movement of said shaft and provided on its periphery with a recess, a control member movable to render said driving connection operative and having a portion provided with a roller traveling on the periphery of said disk and engaging in said recess to automatically render said driving connection inoperative, operative connections between said stock gripping means and said disk and including a movement transmitting means carried by the disk and cooperating with surfaces formed on a movable element to periodically close and release said stock gripping means during different portions of the rotation of said disk, said shaft having a second disk operatively associated therewith to be rotated by the movement of said shaft and provided with movement transmitting means, operative connections between said second disk and said stock feeding means and including operatively interconnected slotted movable plates arranged so that the movement transmitting means on said second disk during the travel of the latter alternately engages in the slots of said plates to move the same and intermittently actuate and restore said stock feeding means.

7. A stock gripping and feeding device for a machine tool comprising stock gripping means, stock feeding means, an intermittently movable shaft, operative connections between said shaft and said stock gripping means for alternately actuating and releasing the same, and operative connections between said shaft and said stock feeding means for alternately actuating the latter and restoring the same to its former position and including an element carried by said shaft and provided with movement transmitting means, a pair of rockable plates provided with intermeshing gear segment portions and each plate having a camming slot with which said movement transmitting means intermittently cooperates during rotation of said element, and means operatively connecting one of said plates with said stock feeding means.

8. A stock feeding and gripping mechanism comprising stock gripping means, stock feeding means, a driving source, an intermittently movable shaft, a normally inoperative driving connection between said driving source and said shaft, a disk operatively associated with said shaft to be rotated thereby and provided on its periphery with a recess, a control member movable to render said driving connection operative and having a portion provided with a roller traveling on the periphery of said disk and engaging in said recess to automatically render said driving connection inoperative, operative connections between said stock gripping means and said disk and including a movement transmitting means carried by said disk and cooperating with surfaces formed on a movable element to periodically close and release said stock gripping means during different portions of the rotation of said disk, said shaft having a second disk mounted thereon and rotated thereby and provided with movement transmitting means, and means operatively connecting said second disk and said stock feeding means and including an element cooperating with the movement transmitting means of said second disk.

9. A stock gripping device for a machine tool comprising stock gripping means, a driving source, an intermittently movable shaft, a normally inoperative driving connection between said driving source and said shaft; operative connections between said shaft and said stock gripping means for alternately actuating and releasing said means and including a disk fixed to said shaft and a movable element operatively associated with and actuated by said disk and operatively connected with said stock gripping means; and means operatively associated with said driving connection for controlling the same and including a member normally occupying a drive released position wherein said driving connection is inoperative but movable to a drive engaged position wherein said driving connection is operative; said member and said disk having cooperating continuously contacting means acting to hold said member in said drive engaged position for a predetermined period during movement of said disk to maintain said driving connection operative and then after said period releasing said member to return to normal drive released position to render said driving connection inoperative.

10. A stock feeding and gripping device for a machine tool comprising stock feeding means, stock gripping means, a driving source, an intermittently movable shaft, a normally inoperative driving connection between said driving source and said shaft, and operative connections between said shaft and both of said means for alternately actuating the latter and including a motion transmitting element carried by said shaft, a movable element actuated by said motion transmitting element and operatively connected with said stock feeding means, a disk fixed to said shaft and a movable element operatively associated with and actuated by said disk and operatively connected with said stock gripping means; and means operatively associated with said driving connection for controlling the same and including a member normally occupying a drive released position wherein said driving connection is inoperative but movable to a drive engaged position wherein said driving connection is operative; said member and said disk having cooperating continuously contacting means acting to hold said member in said drive engaged position for a predetermined period during movement of said disk to maintain said driving connection operative and then after said period releasing said member to return to normal drive released position to render said driving connection inoperative.

11. A stock feeding and gripping device for a machine tool comprising stock feeding means, stock gripping means, a power source, an intermittently movable shaft, a normally inoperative driving connection between said power source and said shaft, and operative connections between said shaft and both of said means for alternately actuating the latter and including a motion transmitting element carried by said shaft, a movable element actuated by said motion transmitting element and operatively connected with said stock feeding means, a disk fixed to said shaft and provided on its periphery with a recess, a second movable element actuated by said disk and operatively connected with said stock gripping means, and a control member movable to render said driving connection operative and having a portion cooperating with the periphery of said disk and engageable in said recess to render said driving connection inoperative after a predetermined operative period.

12. A stock gripping device for a machine tool comprising stock gripping means, a driving source, an intermittently movable shaft, a normally inoperative driving connection between said driving source and said shaft, brake means operatively associated with said driving connection to hold said shaft normally stationary, and operative connections between said shaft and said stock gripping means for alternately actuating and releasing the latter and including a disk fixed to said shaft, a movable element actuated by said disk and operatively connected with said stock gripping means, and means cooperating with said disk for automatically rendering said driving connection inoperative after a predetermined operative period and for applying said brake means when said driving connection is inoperative.

13. A stock feeding and gripping device for a machine tool comprising stock feeding means, stock gripping means, a driving source, an intermittently movable shaft, a normally inoperative driving connection between said driving source and said shaft, a normally applied brake means operatively associated with said driving connection to hold said shaft normally stationary, and operative connections between said shaft and said stock feeding means and said stock gripping means for alternately actuating the same and including a motion transmitting element carried by said shaft, a movable element actuated by said motion transmitting element and operatively connected with said stock feeding means, a disk fixed to said shaft, a second movable element actuated by said disk and operatively connected with said stock gripping means, and manually operated means for releasing said brake means and rendering said driving connection operative, said last means and said disk having cooperating portions for maintaining said driving connection operative for a predetermined period and for then automatically rendering said driving connection inoperative and simultaneosuly applying said brake means.

14. A stock gripping and feeding device for a machine tool comprising stock gripping means, stock feeding means, an intermittently movable shaft, operative connections between said shaft and said stock gripping means for alternately actuating and releasing the same, operative connections between said shaft and said stock feeding means for alternately actuating the latter and restoring the same to its former position and including an element carried by said shaft and provided with movement transmitting means, a pair of operatively interconnected plates rockably mounted independently of said shaft and each provided with camming surfaces with which said movement transmitting means intermittently cooperates during rotation of said element, and means operatively connecting one of said plates with said stock feeding means.

FRED H. BOGART.